(No Model.)

H. P. DEUSCHER.
HARROW.

No. 534,637. Patented Feb. 26, 1895.

WITNESSES
E. J. Schroder
J. J. Richardson

Henry P. Deuscher
INVENTOR

By Robert S. Carr
his ATTORNEY

UNITED STATES PATENT OFFICE.

HENRY P. DEUSCHER, OF HAMILTON, OHIO.

HARROW.

SPECIFICATION forming part of Letters Patent No. 534,637, dated February 26, 1895.

Application filed July 23, 1894. Serial No. 518,298. (No model.)

*To all whom it may concern:*

Be it known that I, HENRY P. DEUSCHER, of Hamilton, Butler county, Ohio, have invented certain new and useful Improvements in Harrows, of which the following is a specification.

My invention relates to that class of harrows that are rectangular in form and are used to pulverize and prepare the soil for planting, and my improvement consists in the manner of attaching the teeth and in the form of lever mechanism to change the slant of the teeth. These objects are attained in the following described manner as illustrated in the accompanying drawings, in which—

Figure 1:
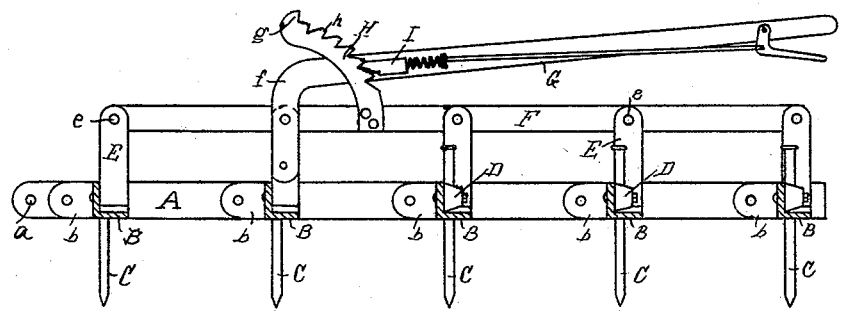
Figure 2:
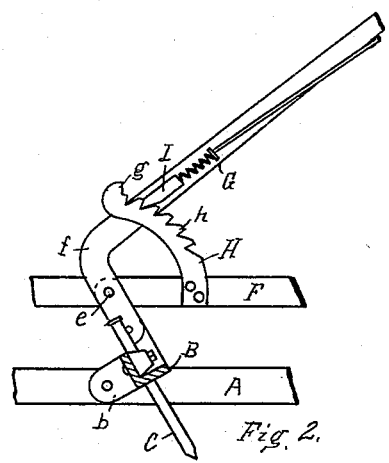
Figure 3:
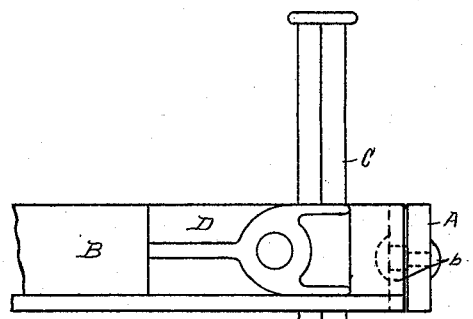
Figure 5:
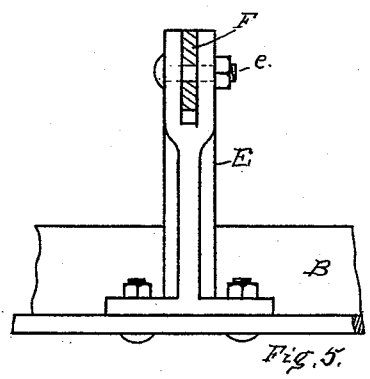
Figure 4:
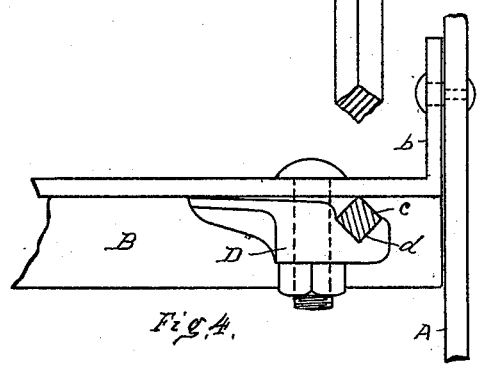

Figure 1 illustrates a longitudinal section of the harrow; Fig. 2, a detail showing the hand lever in a raised position; Figs. 3 and 4, different views showing a harrow tooth attached to a portion of the tooth bar; Fig. 5, an enlarged view of a shifting arm mounted on the middle portion of a tooth bar.

In the drawings A represents the side rails or runners placed on one edge and parallel with each other. They each consist of a bar of flat iron formed with an eye $a$ in the front end for the attachment of the hitching device. Tooth bars B span the distance between the side rails at equal distances apart and parallel with each other. They each consist of a bar of angle iron, one side or leg of which is longer than the other at each end and bent at an angle and forms integral ears $b$ that project forward at right angles thereto from their respective ends. Each of said tooth bars is pivotally secured by its ears to the respective side rails and it is permitted to swing or rock freely between said rails. The surface of the ears in contact with the side rails is of sufficient extent to retain the bars perpendicular to the inside surface of the rails.

The harrow teeth C depend more or less as desired through holes $c$ formed at equal distances apart through one of the sides or legs of the tooth bars. Clamps D bolted to the other leg of the bars are oblong in form and each contains a shallow notch $d$ across one end of its face. Said clamps are bolted to the tooth bars with the notches therein resting over the respective harrow teeth and with the opposite ends thereof resting against the surface of said bars. The middle portion of the clamps is held from contact with the tooth bars by reason of the shallowness of the notches $d$ and the thickness of the harrow teeth therein. The portion of the bars spanned by the clamps yields slightly like a spring under the tension of the clamping bolts to prevent the nuts on the bolts from becoming loosened by any jarring and to cause the clamps to hold the teeth more securely in place on the bars.

Shifting arms E are rigidly mounted on the middle portion of the tooth bars and project upwardly therefrom in the extended plane of the harrow teeth. The top portion of each arm is bifurcated to straddle the reciprocating shifting bar F to which each of said arms is pivotally secured by bolts $e$. Hand lever G is rigidly secured to one of the shifting arms near the front end of the harrow. It is turned at $f$ in a rearward direction and perpendicular to the arm to which it is secured and terminates directly over the rear tooth bar. Segmental rack H is rigidly secured on the shifting bar and extends therefrom in an upward and forward direction through about one-fourth part of a circle described from bolt $e$ of the arm to which the shifting bar is attached as a center. Said rack is formed with teeth $h$ that slant rearwardly thereon and resemble ratchet teeth, and the front end of the rack terminates in stop $g$ to limit the forward movement of the hand lever. Detent latch I is mounted on the hand lever in the usual manner to engage with the teeth on the rack and lock said lever in its various positions against being moved forward by the rearward tendency of the harrow teeth while in action. During the rearward movement of the hand lever the detent latch rides freely over the teeth on the segmental rack without becoming engaged therewith.

The shifting bar is reciprocated forward and backward by the hand lever to simultaneously rock the tooth bars on the side rails and increase or diminish the slant of the harrow teeth downwardly and rearwardly from a vertical position. When the hand lever is locked in its most rearward position the harrow teeth are retained thereby in a vertical position.

It frequently becomes necessary in operating the harrow for the driver walking closely behind it to throw the hand lever forward and backward to momentarily increase the slant of the harrow teeth to free them of trash.

The position of the hand lever is most convenient for the driver to actuate it and it forms no rearward projection as an obstacle to the freedom of the movements of the driver in walking behind the harrow. The stop on the segmental rack limits the forward movement of the hand lever to within easy reach of the driver without the danger of his stepping in the harrow to grasp it.

The position of the teeth in the tooth bars is slightly to one side of the teeth in the bar next in front to more evenly distribute them over the width of the space occupied by the harrow.

A plural number of harrows may be coupled together by their side rails to occupy any width of space desired.

Having fully described my improvement, what I claim as my invention, and desire to secure by Letters Patent, is—

1. In a harrow, the combination, with two perforated side bars, the front end of each of which is adapted to receive the hitching device, of a series of tooth bars between the side bars, each of said tooth bars being formed of angle iron, one side or leg of which is longer than the other and has its ends bent at an angle thereto, and is perforated, bolts through the perforations and through the side bars for pivotally holding the parts of the harrow together, and means for rocking the tooth bars upon their pivots, substantially as set forth.

2. In a harrow, the combination, with two perforated side bars, the front end of each of which is adapted to receive the hitching device, of a series of tooth bars between the side bars, each of said tooth bars being formed of angle iron, one side or leg of which is longer than the other and has its ends bent at right angles thereto, to form ears, and is perforated, bolts through the ears and the side bars for pivotally holding ears against the side bars, teeth secured to the angle bars, a shifting arm rigidly secured to the middle portion of each of the tooth bars and projecting upwardly therefrom in the plane of the harrow teeth, a shifting bar pivotally secured to the upper ends of the arms, a toothed rack secured to the shifting bar, and a rearwardly projecting hand lever rigidly secured to one of the shifting arms and projecting toward the rear of the harrow and provided with a latch for engagement with the rack, substantially as set forth.

HENRY P. DEUSCHER.

Witnesses:
R. S. CARR,
J. E. HANCOCK.